Figure 1:
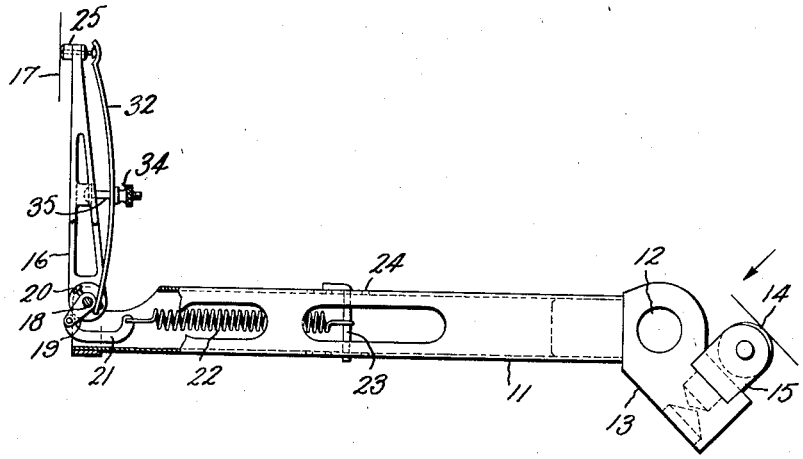

F. B. HOWELL.
RECORDER.
APPLICATION FILED JUNE 24, 1920.

1,438,829.

Patented Dec. 12, 1922.

Inventor:
Fred B. Howell,
by His Attorney.

Patented Dec. 12, 1922.

1,438,829

UNITED STATES PATENT OFFICE.

FRED B. HOWELL, OF SCHENECTADY, NEW YORK, ASSIGNOR TO GENERAL ELECTRIC COMPANY, A CORPORATION OF NEW YORK.

RECORDER.

Application filed June 24, 1920. Serial No. 391,494.

*To all whom it may concern:*

Be it known that I, FRED B. HOWELL, a citizen of the United States, residing at Schenectady, in the county of Schenectady, State of New York, have invented certain new and useful Improvements in Recorders, of which the following is a specification.

My invention relates to recorders, and more particularly to recorders that are adapted to measure and record large or suddenly applied forces, or placed so that it is subjected to vibrations or jars.

In instruments of the character designated it is ordinarily difficult to keep the recording stylus in contact with the record sheet at just the right pressure. The large forces measured causes the stylus to be urged with an irregular pressure upon the record sheet. It is the main object of my invention to correct this defect in recorders. Another object is to make it possible to record forces that are very suddenly applied without the use of inks or any other marking medium. Other objects and advantages of the invention will become apparent as the description proceeds.

I have illustrated my invention as adapted to be used on an instrument known as a test tie, which records the forces acting upon a rail as the locomotive or other rolling stock passes thereover. Such an instrument is described and claimed in an application filed concurrently herewith in the name of William B. Potter, entitled Test tie, Serial No. 391,461, assigned to the same assignee as the present application. In that form of recorder difficulty was experienced due to the stylus jumping off of the record sheet as the rolling stock passed over the test tie. To correct that tendency, I arrange matters in such a way that the recording arm is pressed against the record sheet with a comparatively large force. The recording arm does not rigidly support the stylus but contacts with the record sheet on a smooth, hard surface, such as a finished surface of hardened steel. Such an arrangement enables the recording arm to slide over the record sheet with comparatively little friction which may be neglected due to the fact that extremely large forces are being measured. The pressure tending to urge the smooth surface of the recording arm into contact with the record sheet may be adjusted so as to make it of any desired value. That portion of the recording arm which is in contact with the surface of the record sheet carries a relatively movable recording stylus which is preferably in the form of a slender needle. I have found that I can obtain a good record by using a stylus of soft brass coacting with a record sheet made of paper with a metallic coating, the brass point marking the surface of said sheet and thereby producing a record. The pressure tending to urge this point against the record sheet is obtained by any well known means. The sole item of importance is that this pressure be relatively small and easily regulated. At the same time, the recording arm is urged against the sheet with a comparatively large pressure. In this way the recording stylus is kept in contact with the record sheet even though the force tending to displace the recording arm from the surface of the sheet reaches a comparatively high value. However, the force tending to urge the point against the sheet may be made as light as desired. A stylus constructed so as to form a compound structure, comprising a portion employing a large pressure and one a low pressure, is useful in many types of recorders which are subjected to similar conditions of service as the test tie recorder referred to hereinbefore.

Figure 2:
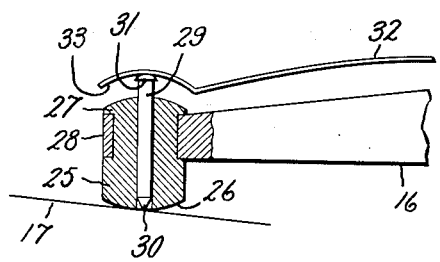

The construction and mode of operation of my invention will be understood by reference to the description and the accompanying drawing, in which Fig. 1 is a general view partly in section, showing the recording arm and stylus and the arrangement whereby said recording arm is actuated; and Fig. 2 is an enlarged section through the stylus and the hardened steel portion of the recording arm showing more clearly how the point of the stylus cooperates with the surface of the record sheet.

Referring now more in detail to the drawings in which like reference characters refer to like parts throughout, I have shown an arm 11, preferably made of a tubular material, adapted to be rotated about a bearing pin coacting with the aperture 12, which is bored in a head casting 13, rigidly secured to the tubular arm 11. This arm 11 merely serves as one element in the recording mechanism and it is rotated in response to variations in the quantity measured by means of pressure applied against 11● the roller 14 in the direction shown by the arrow; the roller is held appropriately in a clevis 15 fastened into the head casting 13. It is to be understood that the particular type of recorder I have shown is but one of a great many that may utilize my invention and it is not intended to limit my invention thereto.

The recording arm proper 16 is arranged to be in contact at one extremity with the surface of the record sheet 17 which is preferably of metal coated paper. At the other extremity of said recording arm there is provided a pivot 18 fastened to said arm and having a bearing in the tubular member 11, whereby the arm may be swung into contact with the record sheet 17. The means shown for urging the extremity of the recording arm 16 against the record sheet comprises a crank arm 19 fastened to the pivot 18 by means of a screw 20 and pivotally connected to a U-shaped link 21, the other extremity of which connects with a tension spring 22 adjustably held in place by a pin 23 passing through the tubular arm 11. When the arm 16 is swung far enough away from the record sheet, the crank arm 19 passes "over center" and the spring 22 thus exerts a force tending to keep the arm in that position. A plurality of apertures 24 are provided in said arm 11 so that the pin 23 may be adjusted so as to urge the recording arm 16 with any desired pressure against the record sheet 17.

The recording arm 16 carries at its extremity the hardened steel portion 25 which is in the shape of an annular shaped bushing and forms one element of my improved compound stylus. The surface 26 nearest to the record sheet 17 is made of the proper form so that it may readily slide thereover. In the present instance I have shown this surface as a convex one, and it is evident that as the arm 11 swings about its pivot the friction between the two surfaces of the record sheet 17 and of the annular shaped member or bushing 25 is comparatively slight. The annular member 25 is appropriately held in the arm 16 by upsetting the portion 27 thereof over the sides of the aperture 28 provided in said arm 16. Passing through a longitudinal aperture through the annular shaped member or bushing 25 is the other element of the compound stylus which comprises a pin shaped portion 29, having a comparatively sharp point 30 arranged to coact with the surface of the record sheet 17. This member 29 I preferably make of a comparatively soft material such as ordinary yellow brass, so that it may produce a readable record on the sheet 17 which has a metallic coating. For the purpose of supplying a good bearing surface I provide a head 31 on said member 29, so that I can expeditiously supply a downward force to the stylus 29. In order to accomplish this result I employ a long, flat leaf spring 32, having a concave portion 33 coacting with the head 31 of the pin shaped stylus 29, as shown in Fig. 2. This leaf spring 32 is of comparatively light material so that the amount of the pressure urging the stylus 29 against the sheet may be made as small as necessary to prevent the scratching of the surface of the record sheet 17. I support the other extremity of said spring 32 at the farther extremity of the recording arm 16. Somewhere along its length I provide the adjusting nut 34 coacting with a stud 35 carried by the recording arm 16 and extending through an aperture in the spring 32. By turning down the nut 34 the pressure exerted upon the stylus 29 is increased. It is clear that by this means I may apply as light a pressure as is needed for the proper production of the record. This is especially important with metallic coated record sheets in which large pressures would cause tearing or scratching of the sheet. It is also evident that it is immaterial so far as the recording pressure is concerned just how large the pressure on the recording arm 16 is varied so long as the surface 26 is always maintained in contact with the surface of the record sheet. To obtain this result it is merely necessary to use a sufficiently strong tension on the spring 22, so that even though the movement of the arm 11 is pulsatory or irregular in any way whatsoever, the arm 16 is always maintained in contact with the record sheet 17. This is the sole condition necessary for the efficient production of the record, since under such circumstances it is possible with my arrangement to maintain a uniform light pressure on the recording point of the stylus.

From the foregoing description it is evident that I have provided an extremely efficient means for recording forces of unusual characteristics. While I have shown in the accompanying drawings one embodiment of my invention, I do not wish to be limited thereto but aim to cover in the appended claims all modifications falling fairly within the scope of my invention.

What I claim as new and desire to secure by Letters Patent of the United States, is:—

1. In a recording instrument, a member, a record sheet, means for urging said member firmly against said sheet so that a limited surface of said member is in contact with said sheet, a stylus carried by said member arranged to contact with said record sheet and relatively movable toward the surface of the record sheet with respect to said member, and means for determining the force with which said stylus contacts with the sheet.

2. In a recording instrument, the recording element of which is subjected to vibrations or jars, a record sheet, a stylus, and means for preserving a steady, constant force between said sheet and stylus including a stylus carrying arm having a surface contacting with said sheet with a comparatively large force, and means urging the stylus against the surface of the record sheet with a constant pressure.

3. In a recording instrument the recording element of which is subjected to vibrations or jars, a record sheet, a member having a hard, smooth surface contacting with the record sheet whereby it may slide readily thereon, said member being urged toward said sheet with a comparatively large force, a stylus of relatively soft material carried by said member, adapted to produce a readable record on said sheet, and means for causing said stylus to contact with the record sheet with a uniform force of comparatively low value.

4. In a recording instrument the recording element of which is subjected to vibrations or jars, a record sheet, a pivoted arm having a portion of hard material contacting with said sheet, means for exerting a comparatively large pressure to keep said portion in contact with said sheet, a recording stylus passing through the portion of hard material, and means carried on said pivoted arm for regulating the pressure on said stylus.

5. In a recording instrument subjected to vibrations or jars, a compound stylus comprising an outer annular shaped portion having a hard, smooth surface adapted to be pressed against the record sheet, and a central pin-shaped portion arranged to produce the record.

In witness whereof, I have hereunto set my hand this 22nd day of June 1920.

FRED B. HOWELL.